(12) United States Patent
Han et al.

(10) Patent No.: US 8,182,750 B2
(45) Date of Patent: May 22, 2012

(54) CARBON MONOXIDE TREATMENT APPARATUS FOR FUEL CELL

(75) Inventors: Man-Seok Han, Yongin-si (KR); Seong-Jin An, Yongin-si (KR); Ju-Yong Kim, Yongin-si (KR); Sung-Chul Lee, Yongin-si (KR); Yong-Kul Lee, Yongin-si (KR); Chan-Ho Lee, Yongin-si (KR); Jun-Sik Kim, Yongin-si (KR); Jin-Goo Ahn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 437 days.

(21) Appl. No.: 12/034,523

(22) Filed: Feb. 20, 2008

(65) Prior Publication Data

US 2008/0253940 A1 Oct. 16, 2008

(30) Foreign Application Priority Data

Apr. 13, 2007 (KR) .................. 10-2007-0036454

(51) Int. Cl.
*B01D 53/34* (2006.01)

(52) U.S. Cl. ........ 422/177; 422/627; 422/638; 422/644; 422/648; 429/412

(58) Field of Classification Search .................. None
See application file for complete search history.

(56) References Cited

U.S. PATENT DOCUMENTS

| | | | | |
|---|---|---|---|---|
| 3,223,081 | A * | 12/1965 | Hunt | 422/211 |
| 6,312,650 | B1 * | 11/2001 | Frederiksen et al. | 422/177 |
| 6,835,219 | B2 * | 12/2004 | Gittleman | 422/211 |
| 6,893,754 | B2 * | 5/2005 | Agar et al. | 429/17 |
| 7,481,859 | B2 * | 1/2009 | Rostrup-Nielsen et al. | 422/200 |
| 2004/0197622 | A1 * | 10/2004 | Wheat et al. | 429/22 |

FOREIGN PATENT DOCUMENTS

| | | |
|---|---|---|
| JP | 8-106913 | 4/1996 |
| JP | 2000-302407 | 10/2000 |

(Continued)

OTHER PUBLICATIONS

Patent Abstracts of Japan, Publication No. 08-106913; Date of Publication: Apr. 23, 1996; in the name of Takeshi Hara, et al.

(Continued)

*Primary Examiner* — Walter D Griffin
*Assistant Examiner* — Timothy Cleveland
(74) *Attorney, Agent, or Firm* — Christie, Parker & Hale, LLP (57) ABSTRACT

A carbon monoxide treatment apparatus according to an exemplary embodiment of the present invention includes: a reactor body; a partitioning plate located inside the reactor body for partitioning an internal space of the reactor body into a first section and a second section; a channel member in the first section for transporting an introduced gas including a reformed gas and an oxidant gas to the second section; and a reaction unit around the channel member of the first section for reducing a concentration level of carbon monoxide in the introduced gas moving through the first section by utilizing a preferential oxidation reaction of the carbon monoxide and the oxidant gas of the introduced gas, wherein moisture of the introduced gas that has been partially condensed when passing through the channel member is stored in the second section.

18 Claims, 6 Drawing Sheets

FOREIGN PATENT DOCUMENTS

| | | |
|---|---|---|
| JP | 2002-134146 | 5/2002 |
| KR | 2003-0021080 | 3/2003 |
| KR | 10-2004-0005065 | 1/2004 |

OTHER PUBLICATIONS

Patent Abstracts of Japan, Publication No. 2000-302407; Date of Publication: Oct. 31, 2000; in the name of Kiyohito Murata, et al.

Patent Abstracts of Japan, Publication No. 2002-134146; Date of Publication: May 10, 2002; in the name of Takenori Watabe.

Korean Patent Abstracts, Publication No. 1020030021080 A; Date of Publication: Mar. 12, 2003; in the name of In Cheol Hwang.

Korean Patent Abstracts, Publication No. 1020040005065 A; Date of Publication: Jan. 16, 2004; in the name of In Cheol Hwang.

* cited by examiner

CARBON MONOXIDE TREATMENT APPARATUS FOR FUEL CELL

CROSS-REFERENCE TO RELATED APPLICATION

This application claims priority to and the benefit of Korean Patent Application No. 10-2007-0036454, filed in the Korean Intellectual Property Office on Apr. 13, 2007, the entire content of which is incorporated herein by reference.

BACKGROUND OF THE INVENTION

1. Field of the Invention

The present invention relates to a carbon monoxide treatment apparatus. More particularly, the present invention relates to a carbon monoxide treatment apparatus for a fuel cell.

2. Description of the Related Art

A fuel cell is a power generator that generates electrical energy by utilizing a fuel and an oxidant gas.

A fuel cell can be broadly classified into a polymer electrolyte membrane (PEM) fuel cell or a direct oxidation membrane (DOM) fuel cell.

The PEM fuel cell receives a reformed gas generated by a reformer and an oxidant gas, and generates electrical energy by using an electrical-chemical reaction of the reformed gas and the oxidant gas.

Here, the reformer generates the reformed gas by steam reforming a fuel (i.e., by utilizing a steam reforming reaction), and the reformed gas includes carbon monoxide, a large amount of hydrogen gas, and water vapor.

The carbon monoxide included in the reformed gas is reduced in concentration by a carbon monoxide treatment apparatus, and the carbon monoxide treatment apparatus is structured to reduce a concentration level of the carbon monoxide by utilizing a preferential CO oxidation (PROX) reaction of the carbon monoxide and an oxidant gas.

A conventional carbon monoxide treatment apparatus includes a cylinder-type reactor with a catalyst embedded in the reactor. The conventional carbon monoxide treatment apparatus supplies the reformed gas and the oxidant gas into the reactor through one end of the reactor, and the catalyst promotes a preferential oxidation reaction of the carbon monoxide such that the concentration level of the carbon monoxide is reduced. The reformed gas having carbon monoxide reduced in concentration is emitted through the other end of the reactor and then supplied to the fuel cell.

However, the conventional carbon monoxide treatment apparatus may contain water vapor from the reformed gas, and the moisture is partially condensed through a supply channel or in the reactor so that condensate water contacts the catalyst.

Therefore, the conventional carbon monoxide treatment apparatus may interrupt absorption of carbon monoxide and the oxidant gas that participate in the preferential oxidation reaction since the condensate water is absorbed into an activated surface of the catalyst.

Accordingly, the catalyst cannot be continuously activated and heat of reaction for a specific reaction cannot be easily generated so that an initial driving time of the conventional carbon monoxide treatment apparatus is increased, thereby deteriorating performance and efficiency of the carbon monoxide treatment apparatus.

The above information disclosed in this Background section is only for enhancement of understanding of the background of the invention and therefore it may contain information that does not form the prior art that is already known in this country to a person of ordinary skill in the art.

SUMMARY OF THE INVENTION

An aspect of an embodiment of the present invention is directed to a carbon monoxide treatment apparatus for a fuel cell that is capable of reducing a concentration level of carbon monoxide by utilizing a preferential oxidation reaction of the carbon monoxide.

An aspect of an embodiment of the present invention is directed to a carbon monoxide treatment apparatus for a fuel cell that utilizes a simple structure to reduce or minimize absorption of moisture of partially condensed reformed gas into a catalyst.

An exemplary carbon monoxide treatment apparatus for a fuel cell according to one embodiment of the present invention reduces a concentration level of carbon monoxide included in reformed gas by utilizing a preferential oxidant reaction of the carbon monoxide. The carbon monoxide treatment apparatus for a fuel cell includes a catalyst reaction unit, a channel unit, and a condensate water storage unit. The catalyst reaction unit includes catalysts for promoting the preferential oxidation reaction. The channel unit introduces the reformed gas into the catalyst reaction unit. The condensate water storage unit stores moisture of the reformed gas that has been partially condensed while passing through the channel unit.

In one embodiment, the catalyst reaction unit and the condensate water storage unit are integrally formed as an integral body, and the channel unit is individually (e.g., independently or separately) formed as a separate body from the catalyst reaction unit and the condensate water storage unit.

In one embodiment, the catalyst reaction unit, the channel unit, and the condensate water storage unit are respectively partitioned inside a container and communicate with each other.

The carbon monoxide treatment apparatus may further include a partitioning plate for partitioning the catalyst reaction unit and the condensate water storage unit, and the partitioning plate may be provided inside the container and have a plurality of holes.

The channel unit may be disposed in a direction perpendicular to a side of the partitioning plate facing the catalyst reaction unit.

The reformed gas and oxidant gas may form a stream that flows into the channel unit, passes the condensate water storage unit, and flows into the catalyst reaction unit through holes of the partitioning plate.

An exemplary carbon monoxide treatment apparatus for a fuel cell according to another embodiment of the present invention includes a reactor body, a partitioning plate, a channel member, and a reaction unit. The partitioning plate is located inside the reactor body for partitioning an internal space of the reactor body into a first section and a second section. The channel member is provided within the first section for transporting an introduced gas including a reformed gas and an oxidant gas to the second section. The reaction unit is provided around the channel member of the first section for reducing a concentration level of carbon monoxide in the introduced gas moving through the first section by utilizing a preferential oxidation reaction of the carbon monoxide and the oxidant gas of the introduced gas. In addition, the second section is configured to store moisture of the introduced gas, the moisture being partially condensed through the channel member.

The second section may be formed as a condensate water storage unit.

The reactor body may include an introduced gas inlet unit and a generated gas outlet unit. The introduced gas inlet unit may introduce the reformed gas to the channel member, and the generated gas outlet unit may emit a generated gas having reduced carbon monoxide concentration.

The introduced gas inlet unit and the generated gas output may be disposed on a same plane of the reactor body, and a flow direction of the introduced gas may be opposite to a flow direction of the generated gas.

The channel member may be formed as a pipe and be connected with the partitioning plate and disposed in a direction perpendicular to a side of the partitioning plate facing the first section.

The reaction unit may be filled with a plurality of catalyst pellets.

The reaction unit may include a monolith-type catalyst support and a catalyst layer coated to the catalyst support.

The condensate water storage unit may include an absorbing member located in the second section for absorbing the condensate water.

The carbon monoxide treatment apparatus for a fuel cell may further include an outlet unit for draining the condensate water.

The outlet unit may include an outlet unit line and a valve. The outlet unit line may include an outlet unit channel for the condensate water, and connect with the condensate water storage unit. The valve may be provided in the outlet unit line.

The outlet unit may include a water level sensor in the condensate water storage unit for detecting a level of the condensate water.

The valve may be provided as a solenoid valve that selectively opens/closes the outlet unit channel according to a detection signal of the water level sensor.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF THE EMBODIMENTS

In the following detailed description, only certain exemplary embodiments of the present invention are shown and described, simply by way of illustration. As those skilled in the art would realize, the described exemplary embodiments may be modified in various different ways, all without departing from the spirit or scope of the present invention. Accordingly, the drawings and description are to be regarded as illustrative in nature, and not restrictive.

Figure 1:
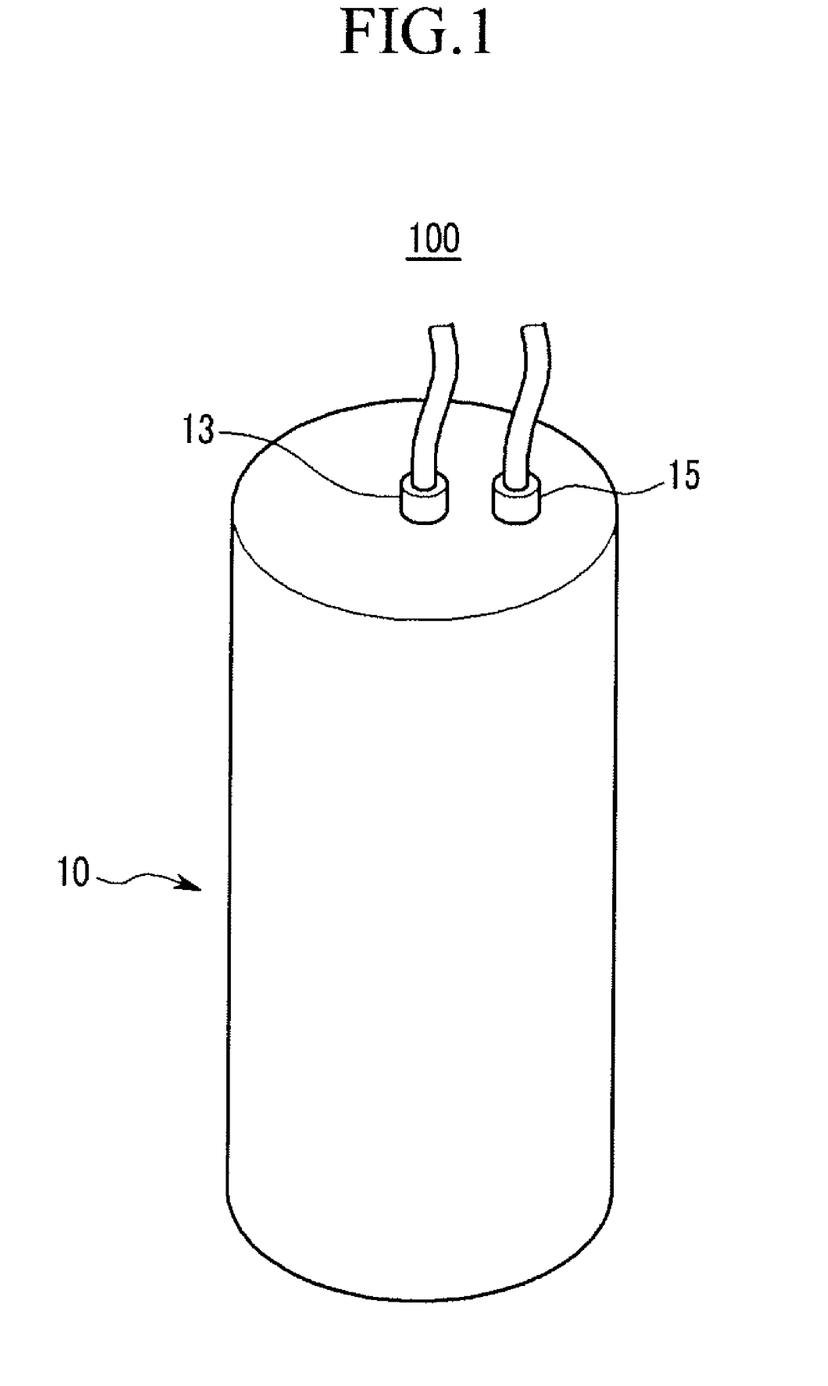
FIG. 1 is a perspective schematic view of a carbon monoxide treatment apparatus for a fuel cell according to a first exemplary embodiment of the present invention.
Figure 2:
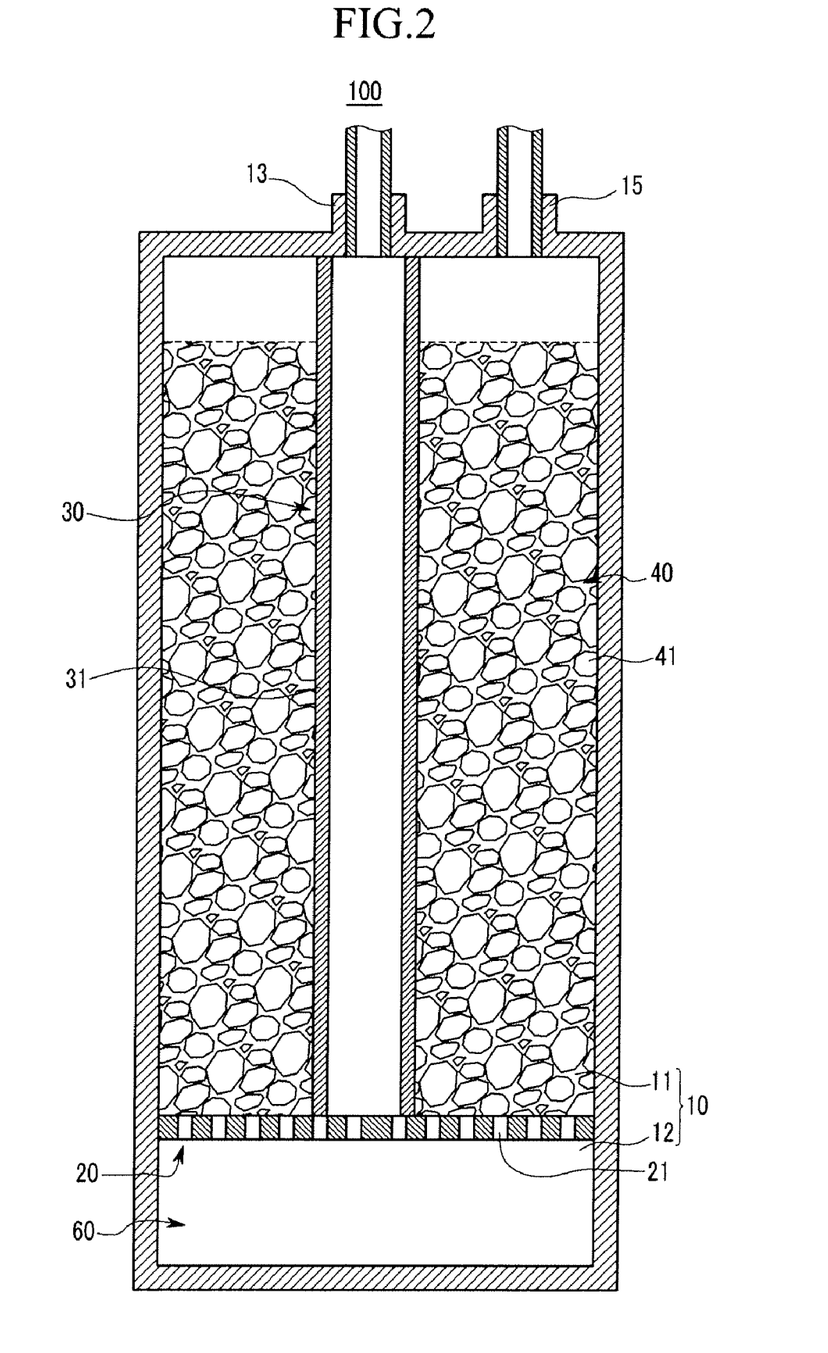
FIG. 2 is a cross-sectional schematic view of the treatment apparatus of FIG. 1.

FIG. 1 is a perspective schematic view of a carbon monoxide treatment apparatus for a fuel cell according to a first exemplary embodiment of the present invention, and FIG. 2 is a cross-sectional schematic view of the treatment apparatus of FIG. 1.

As shown in FIG. 1 and FIG. 2, a carbon monoxide treatment apparatus 100 is formed of a preferential CO oxidation (PROX) reactor that receives a reformed gas generated by a reformer and an oxidant gas, and reduces a concentration level of carbon monoxide included in the reformed gas by a preferential oxidant reaction of the carbon monoxide.

Hereinafter, the reformed gas generated by the reformer and the oxidant gas will be referred to as "introduced gas", and the reformed gas having carbon monoxide reduced in concentration will be referred to as "generated gas".

The reformer can be a suitable reformer that reforms gas by using a steam reforming reaction. The reformed gas is mainly formed of a large amount of hydrogen gas, and includes water vapor (moisture) in addition to the carbon monoxide.

The carbon monoxide treatment apparatus 100 is connected with a fuel cell and provides the generated gas to the fuel cell. The fuel cell is formed as a typical polymer electrolyte membrane fuel cell (PEMFC) that generates electric energy by using an electrochemical reaction of the generated gas and an additionally provided oxidant gas.

The carbon monoxide treatment apparatus 100 can separately store moisture of the introduced gas that is partially condensed in the process during which the introduced gas is reacted with a catalyst that promotes the preferential oxidation reaction of the carbon monoxide to produce the generated gas.

Here, the carbon monoxide treatment apparatus 100 includes a reactor body 10, an introduced gas channel 30, a catalyst reaction unit 40, and a condensate water storage unit 60. The introduced gas channel 30, the catalyst reaction unit 40, and the condensate water storage unit 60 are formed in the reactor body 10.

The reactor body 10 is a cylindrical vessel having closed lateral ends, and is internally divided into a first section 11 and a second section 12 by a disc-type partitioning plate 20.

The partitioning plate 20 includes a plurality of holes 21, and the first section 11 and the second section 12 of the reactor body 10 communicate with each other through the respective holes 21.

The generated gas flows to the second section 12 of the reactor body 10 through the channel 30. The channel 30 includes a pipe-type channel member 31.

The length of the channel member 31 corresponds to that of the first section 11 of the reactor body 10, and it has opened lateral ends. The channel member 31 is disposed within the first section 11 of the reactor body 10 in a perpendicular direction to a plane of the partitioning plate 20, and is fixed to an upper surface of the partitioning plate 20. In this case, an internal space of the channel member 31 communicates with the second section 12 through holes of the partitioning plate 20.

According to another exemplary embodiment of the present invention, an internal space of the channel member 31 may communicate with the second section 12 through a single hole formed in a center portion of the partitioning plate 20 rather than through the holes 21 of the partitioning plate 20.

An introduced gas inlet unit 13 is formed on an upper surface of the reactor body 10 such that the reformed gas is introduced to the channel member 31 therethrough.

The introduced gas inlet unit 13 communicates with the channel member 31, and is connected with a reformer and an oxidant gas supply source by a pipe line. In one embodiment, the oxidant gas supply source includes a suitable air pump that adds air to the reformed gas.

Figure 3:
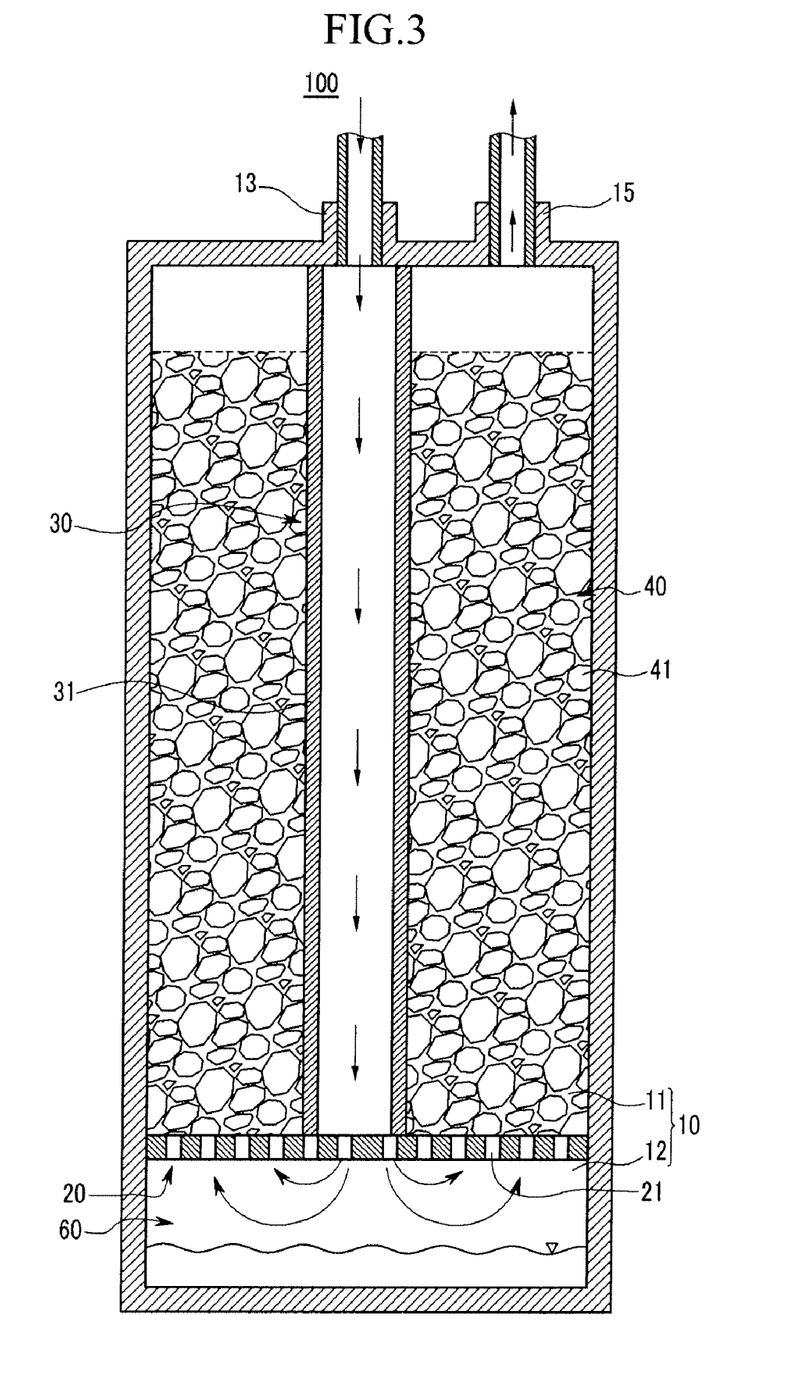
FIG. 3 is a cross-sectional schematic view showing an operation of the carbon monoxide treatment apparatus for a fuel cell according to the first exemplary embodiment of the present invention.

Therefore, when the introduced gas is input through the introduced gas inlet unit 13, the introduced gas flows through the internal space of the channel member 31, enters the second section 12 through the holes 21, and is dispersed through the holes 21, forming a stream flowing through the first section 11 (refer to arrows of FIG. 3).

According to the present exemplary embodiment, the catalyst reaction unit 40 reduces a concentration level of the carbon monoxide by utilizing the preferential oxidation reaction of the carbon monoxide and the oxidant gas of the introduced gas that flows through the first section 11.

The catalyst reaction unit 40 is formed in the first section 11 of the reactor body 10. The catalyst reaction unit 40 is filled with a plurality of catalyst pellets 41 surrounding the channel member 31 and supported by the partitioning plate 20.

The catalyst of the catalyst pellets 41 promotes the preferential oxidation reaction of the carbon monoxide and the oxidant gas, and is formed of a type of support (or a predetermined support) containing a suitable catalysis material such as platinum (Pt) and/or ruthenium (Ru). The type of support is formed of alumina ($Al_2O_3$), silica ($SiO_2$), and/or titania ($TiO_2$).

Therefore, in the catalyst reaction unit 40, the introduced gas flows to the second section 12 through the channel member 31 and moves to the first section 11 from the second section 12, and then the introduced gas passes the catalyst pellets 41 and thus the introduced gas is treated by the preferential oxidation reaction of the carbon monoxide and the oxidant gas. Thereby, the concentration level of the carbon monoxide in the introduced gas is reduced, producing the generated gas.

In order to control the introduced gas to pass through the catalyst pellets 41 and produce the generated gas in the catalyst reaction unit 40, a generated gas outlet unit 15 is provided on an upper surface of the reactor body 10.

The generated gas outlet unit 15 and the introduced gas inlet unit 13 are individually (i.e., independently or separately) provided on the same plane of the upper surface of the reactor body 10. The generated gas outlet unit 15 communicates with the catalyst reaction unit 40, and is connected with the fuel cell by a pipe line.

According to the present exemplary embodiment, the condensate water storage unit 60 stores moisture of introduced gas that has been partially condensed when passing through the channel member 31. The condensate water storage unit 60 corresponds to the second section 12 of the reactor body 10, and is integrally formed with the catalyst reaction unit 40 and individually (i.e., independently or separately) formed with the channel member 31.

Moisture of the generated gas that partially condenses while passing through the channel member 31 flows along the gravity direction through the channel member 31 and through holes of the partitioning plate 20, and is stored in the condensate water storage unit 60.

Operation of the carbon monoxide treatment apparatus 100 for a fuel cell according to a first exemplary embodiment of the present invention will now be described in more detail.

The introduced gas, that is, the reformed gas generated by a steam reforming reaction of fuel in the reformer and the oxidant gas supplied from the oxidant gas supply source are input to (or into) the internal space of the channel member 31 through the introduced gas inlet unit 13. In this case, the reformed gas (or hydrogen-rich gas) is mainly formed of a large amount of hydrogen gas, and includes water vapor in addition to carbon monoxide.

The introduced gas flows through the internal space of the channel member 31 along the gravity direction, enters into the condensate water storage unit 60 through the partitioning plate 20, and enters into the catalyst reaction unit 40 through the holes 21, as shown by the arrows in FIG. 3. When the introduced gas enters into the catalyst reaction unit 40, the introduced gas is dispersed by the respective holes 21.

In this process, the introduced gas is partially condensed when it passes through the channel member 31, and moisture of the partially condensed introduced gas flows through the channel member 31 along the gravity direction and is stored in the condensate water storage unit 60. Here, residual water vapor that has not been condensed to water flows into the catalyst reaction unit 40.

The introduced gas passes around the catalyst pellets 41 in the catalyst reaction unit 40, and thus generated gas is produced. Here, the catalyst of the catalyst pellets 41 promotes the preferential oxidation reaction of the carbon monoxide and the oxidant gas of the introduced gas so that a concentration level of the carbon monoxide in the resulting generated gas is reduced.

The generated gas is emitted through the generated gas outlet unit 15, and is supplied to the fuel cell through the pipe line. In this case, the generated gas is emitted in a direction opposite to the inlet unit direction of the introduced gas since the generated gas outlet unit 15 and the introduced gas inlet unit 13 are individually (i.e., independently or separately) disposed on the same plane of the upper surface of the reactor body 10.

According to the first exemplary embodiment of the present invention, since the moisture of the introduced gas that has been partially condensed in the channel member 31 is stored in the condensate water storage unit 60, the catalyst pellets 41 do not physically contact the moisture, so the catalyst of the catalyst pellets 41 can be continuously activated and the preferential oxidation reaction is effectively conducted. In addition, since the catalyst does not physically contact the moisture, the heat of reaction for a specific reaction (PROX reaction) can be easily generated.

Figure 4:
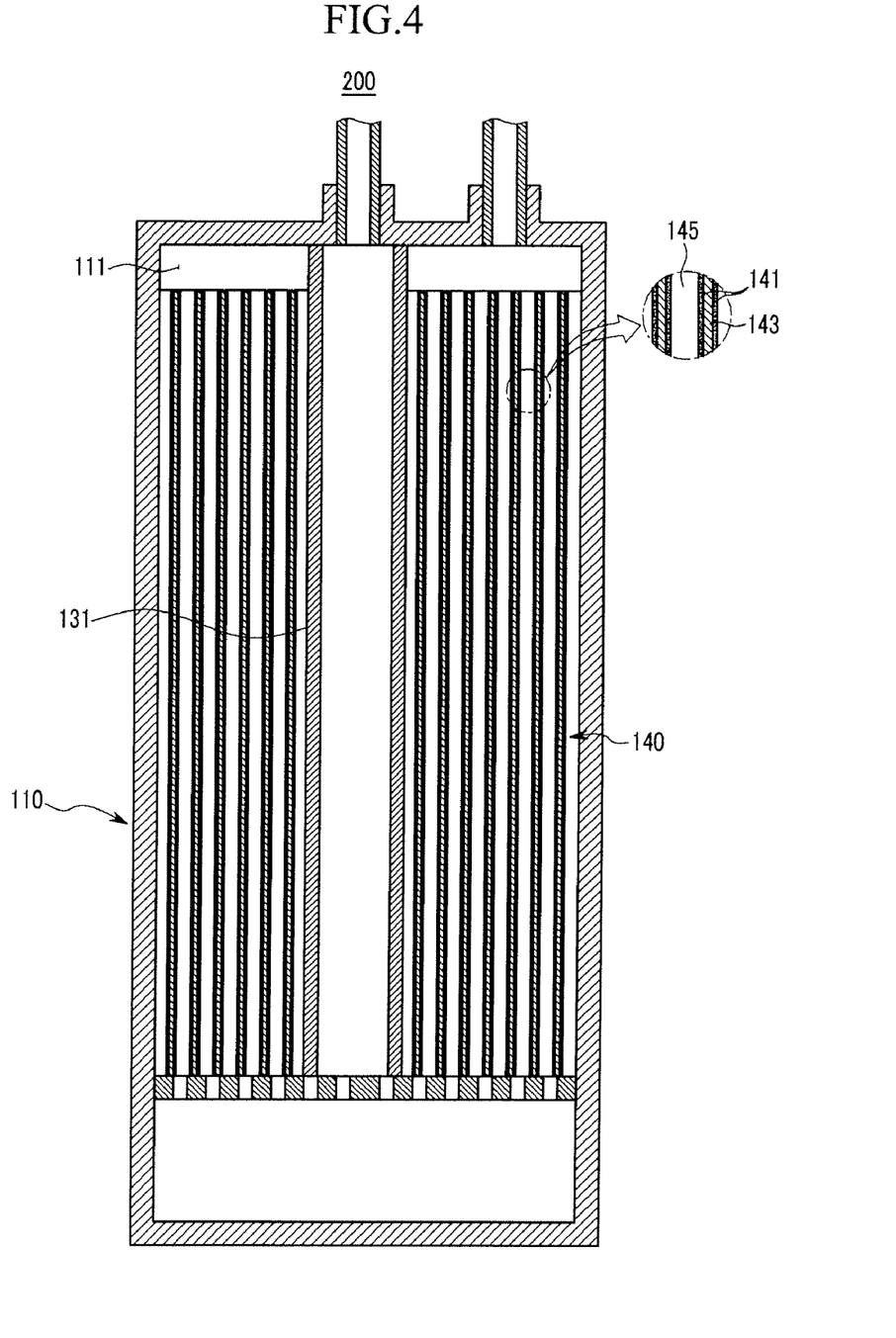
FIG. 4 is a cross-sectional schematic view showing an operation of the carbon monoxide treatment apparatus for a fuel cell according to a second exemplary embodiment of the present invention.

FIG. 4 is a cross-sectional schematic view of a carbon monoxide treatment apparatus for a fuel cell according to a second exemplary embodiment of the present invention.

As shown in FIG. 4, a basic structure of the carbon monoxide treatment apparatus 200 for a fuel cell according to the second exemplary embodiment of the present invention is similar to that of the carbon monoxide treatment apparatus of the first exemplary embodiment. However, a catalyst reaction unit 140 of the carbon monoxide treatment apparatus 200 for a fuel cell according to the second exemplary embodiment of the present invention is formed with a suitable monolith-type support 143 and a catalyst layer 141 coated over (or to) the support 143.

In the second exemplary embodiment, the support 143 is disposed at an exterior side of a channel member 131 in a first section 111 of a reactor body 110. The support 143 has a plurality of honeycomb channels 145 disposed in parallel with the flow of the introduced gas, and is manufactured as an integral module by extrusion molding on a ceramic or metal material. In one embodiment, the catalyst layer 141 is coated over (or on) inner surface(s) of the channels 145 of the support 143.

Configuration and operation of the carbon monoxide treatment apparatus 200 for a fuel cell according to the second exemplary embodiment of the present invention are the same (or substantially the same) as in the first exemplary embodiment of the present invention, and therefore further description thereof will not be provided.

Figure 5:
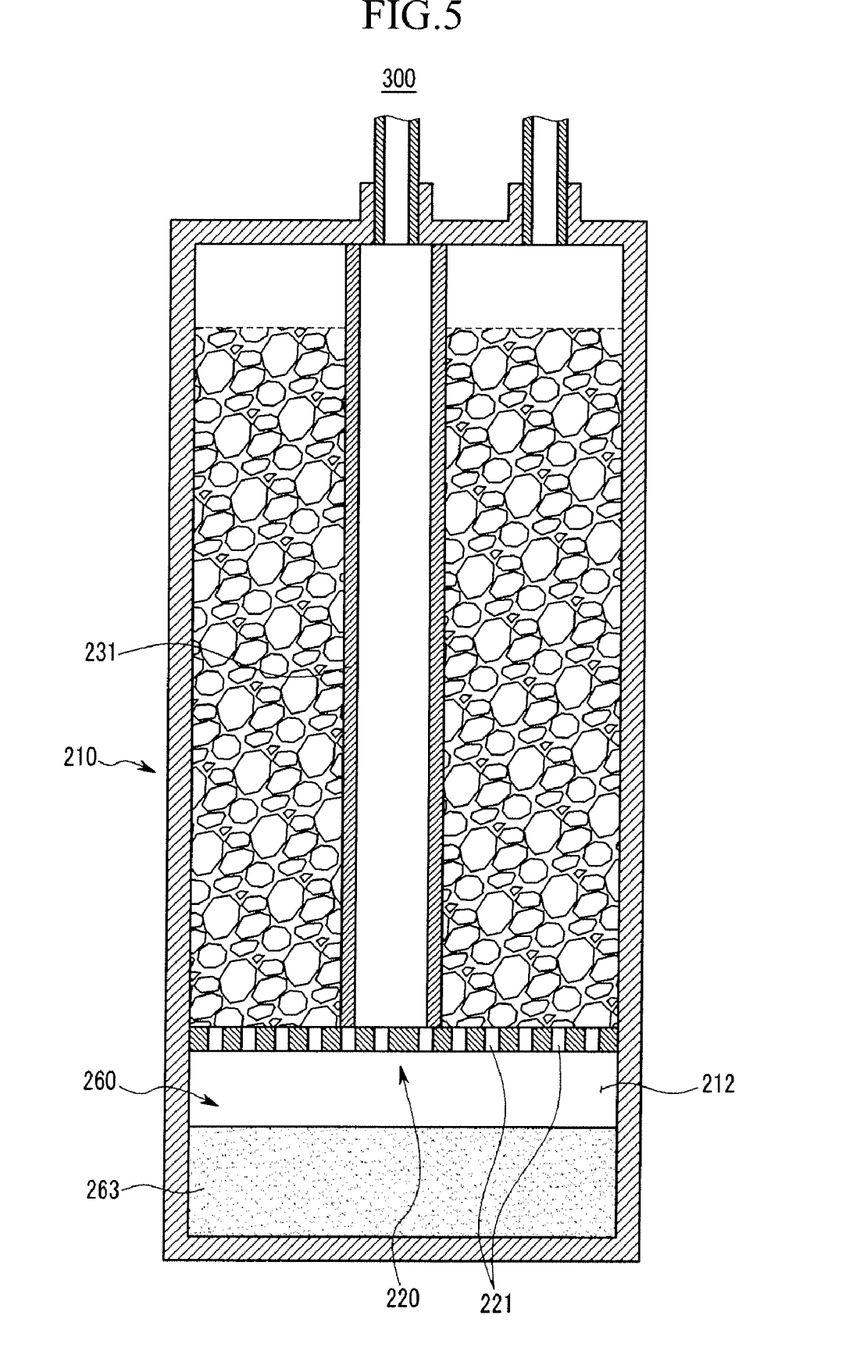
FIG. 5 is a cross-sectional schematic view showing an operation of the carbon monoxide treatment apparatus for a fuel cell according to a third exemplary embodiment of the present invention.

FIG. 5 is a cross-sectional view of a carbon monoxide treatment apparatus for a fuel cell according to a third exemplary embodiment of the present invention.

As shown in FIG. 5, a basic structure of the carbon monoxide treatment apparatus 300 for a fuel cell according to the third exemplary embodiment of the present invention is similar to that of the carbon monoxide treatment apparatus of the first exemplary embodiment. However, a condensate water storage unit 260 of the carbon monoxide treatment apparatus 300 for a fuel cell according to the third exemplary embodiment of the present invention includes an absorbing member 263 provided in a second section 212 of a reactor body 210.

In the present exemplary embodiment, the absorbing member 263 absorbs condensate water flowing into the second section 212 of the reactor body 210 by utilizing a capillary phenomenon. The absorbing member 263 can be provided as a typical absorber having multiple holes, such as a sponge.

Moisture of introduced gas that has been partially condensed while passing through a channel member 231 flows into the second section 212 of the reactor body 210 through holes 221 of a partitioning plate 220, and is then absorbed by the absorbing member 263 in the second section 212.

As described, the absorbing member 263 is provided in the second section 212 of the reactor body 210 in order to support orientation freedom of the carbon monoxide treatment apparatus. That is, condensate water can be readily stored in the second section 212 regardless of a location (or orientation) of the carbon monoxide treatment apparatus due to the absorbing member 263.

Other constituent elements of the carbon monoxide treatment apparatus 300 for a fuel cell according to the third exemplary embodiment of the present invention are the same (or substantially the same) as in the first and second exemplary embodiments of the present invention, and therefore further description thereof will not be provided.

Figure 6:
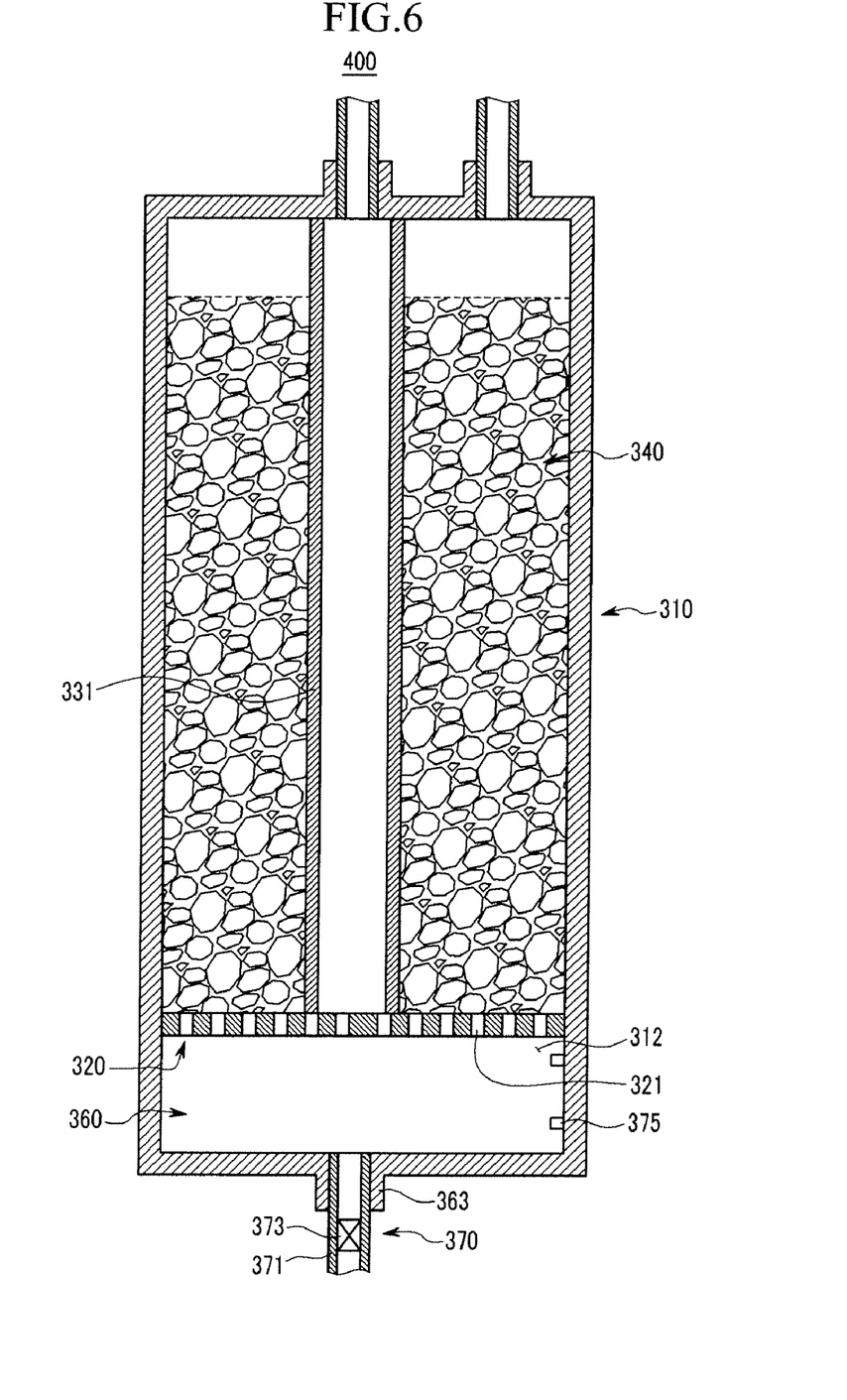
FIG. 6 is a schematic cross-sectional schematic view showing an operation of the carbon monoxide treatment apparatus for a fuel cell according to a fourth exemplary embodiment of the present invention.

FIG. 6 is a cross-sectional view of a carbon monoxide treatment apparatus for a fuel cell according to a fourth exemplary embodiment of the present invention.

As shown in FIG. 6, a carbon monoxide treatment apparatus 400 for a fuel cell according to the fourth exemplary embodiment of the present invention is similar to the carbon monoxide treatment apparatus of the first exemplary embodiment, but it further includes an outlet unit 370 for selectively draining condensate water stored in a condensate water storage unit 360.

In the present exemplary embodiment, the outlet unit 370 includes an outlet unit line 371 connected with the condensate water storage unit 360, a valve 373 provided in the outlet unit line 371, and a water level sensor 375 provided in the condensate water storage unit 360.

A first end of the outlet unit line 371 is connected with a condensate water outlet unit 363 provided in the condensate water storage unit 360, and can be provided as a pipe line having an outlet unit channel through which condensate water can be drained.

A second end of the outlet unit line 371 may be connected with a reformer or a water tank for recycling the condensate water.

The outlet unit line 371 may be coupled to a suitable pump for draining the condensate water stored in the condensate water storage unit 360 with a pumping pressure.

In one embodiment, the valve 373 is a suitable solenoid valve for selectively opening/closing a channel of the outlet unit line 317 according to an electrical control signal.

The water level sensor 375 is disposed inside the condensate water storage unit 360, that is, in the second section 312 of the reactor body 310. The water level sensor 375 is provided as a typical water level sensor that can measure a water level of condensate water stored in the condensate water storage unit 360 by utilizing electrical resistance.

The water level sensor 375 is connected with a controller that receives a detection signal corresponding to the level of the condensate water from the water level sensor 375, converts the detection signal into a control signal, and applies the control signal to the valve 373.

As described, the outlet unit 370 is provided in the carbon monoxide treatment apparatus 400 in order to prevent (or minimize or reduce) inflow of the condensate water from the second section 312 into a catalyst reaction unit 340 through holes 321 of a partitioning plate 320 when the condensate water is continuously stored in the condensate water storage unit 360 and when the amount of the condensate water exceeds capacity of the second section 312.

In the carbon monoxide treatment apparatus 400 according to the fourth exemplary embodiment of the present invention, moisture of introduced gas that has been partially condensed in a channel member 331 is stored in the condensate water storage unit 360 by passing through the holes 321 of the partitioning plate 320 as in the first exemplary embodiment of the present invention. In this case, the channel of the outlet unit line 371 is closed by the valve 373.

Through this process, the water level sensor 375 detects a water level of the condensate water stored in the condensate water storage unit 360 and provides a detection signal to the controller.

When the water level of the condensate water stored in the condensate water storage unit 360 does not exceed a referenced (or predetermined) level, the controller receives a detection signal corresponding to the water level from the water level sensor 375, converts the detection signal into an electrical control signal (i.e. OFF signal), and provides the control signal to the valve 373. Then, the valve 373 maintains the channel of the outlet unit line 371 to be closed according to the control signal.

When the water level of the condensate water stored in the condensate water storage unit 360 exceeds the referenced (or predetermined) level, the controller receives a detection signal corresponding to the water level from the water level sensor 375, converts the detection signal into an electrical control signal (i.e., ON signal), and applies the control signal to the valve 373. Then, the valve 373 is driven by the control signal and opens the channel of the outlet unit line 371.

Therefore, the condensate water stored in the condensate water storage unit 360 is emitted out of the reactor body 310 (and, e.g., to an external reservoir) as the channel of the outlet unit line 317 is opened. In one embodiment, the emitted condensate water is supplied to the reformer or the water tank and can be recycled.

Other operations and configurations of the carbon monoxide treatment apparatus 400 for a fuel cell according to the fourth exemplary embodiment of the present invention are the same (or substantially the same) as those of the previous exemplary embodiments, and therefore further description thereof will not be provided.

According to the previously described exemplary embodiments of the present invention, catalysts can be continuously activated by minimizing (or reducing) liquid absorption into the catalysts, and delay of an initial driving time of the carbon monoxide treatment apparatus can be prevented (reduced).

Accordingly, performance and reaction efficiency of the overall apparatus can be improved according to the exemplary embodiments of the present invention.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A carbon monoxide treatment apparatus for a fuel cell, the carbon monoxide treatment apparatus being adapted to reduce a concentration level of carbon monoxide included in a reformed gas by utilizing a preferential oxidation reaction of the carbon monoxide, the carbon monoxide treatment apparatus comprising:
   a moisture condensative channel unit for introducing the reformed gas into a catalyst reaction unit;
   a condensate water storage unit for storing moisture of the reformed gas, the moisture being partially condensed while passing through the channel unit; and
   an outlet unit for draining the condensate water, the catalyst reaction unit comprising catalysts for promoting the preferential oxidation reaction, the catalyst reaction unit configured to receive the reformed gas directly from the condensate water storage unit.

2. The carbon monoxide treatment apparatus of claim 1, wherein the catalyst reaction unit and the condensate water storage unit are an integral body, and wherein the channel unit is a separate body from the catalyst reaction unit and the condensate water storage unit.

3. The carbon monoxide treatment apparatus of claim 1, wherein the catalyst reaction unit, the channel unit, and the condensate water storage unit are respectively partitioned inside a container and communicate with each other.

4. The carbon monoxide treatment apparatus of claim 3, further comprising:
   a partitioning plate for partitioning the catalyst reaction unit and the condensate water storage unit, the partitioning plate being provided inside the container and having at least one hole.

5. The carbon monoxide treatment apparatus of claim 4, wherein the channel unit is disposed in a direction perpendicular to a side of the partitioning plate facing the catalyst reaction unit.

6. The carbon monoxide treatment apparatus of claim 4, wherein the channel unit, the condensate water storage unit, and the catalyst reaction unit are configured to allow a stream of the reformed gas and an oxidant gas to flow into the channel unit, to pass the condensate water storage unit through the holes of the partitioning plate, and to flow through the catalyst reaction unit.

7. The carbon monoxide treatment apparatus of claim 1, wherein the outlet unit comprises:
   an outlet unit line comprising an outlet unit channel for the condensate water, and connected with the condensate water storage unit; and
   a valve in the outlet unit line,
   wherein the outlet unit comprises a water level sensor in the condensate water storage unit for detecting a level of the condensate water, and
   wherein the valve is for selectively opening/closing the outlet unit channel according to a detection signal of the water level sensor.

8. A carbon monoxide treatment apparatus for a fuel cell, the carbon monoxide treatment apparatus comprising:
   a reactor body;
   a partitioning plate located inside the reactor body for partitioning an internal space of the reactor body into a first section and a second section, the partitioning plate having at least one hole;
   a moisture condensative channel member in the first section for transporting an introduced gas including a reformed gas and an oxidant gas to the second section; and
   a catalyst reaction unit around the channel member of the first section, the catalyst reaction unit comprising catalysts for reducing a concentration level of carbon monoxide in the introduced gas moving through the first section by utilizing a preferential oxidation reaction of the carbon monoxide and the oxidant gas of the introduced gas, and the catalyst reaction unit being configured to receive the introduced gas directly from the second section,
   wherein the second section is configured to store moisture of the introduced gas, the moisture being partially condensed through the channel member, and the second section comprises an absorbing member for absorbing the moisture of the introduced gas.

9. The carbon monoxide treatment apparatus of claim 8, wherein the second section is a condensate water storage unit.

10. The carbon monoxide treatment apparatus of claim 8, wherein the reactor body comprises:
    an introduced gas inlet unit for introducing the introduced gas to the channel member; and
    a generated gas outlet unit for emitting a generated gas having reduced carbon monoxide concentration.

11. The carbon monoxide treatment apparatus of claim 10, wherein the introduced gas inlet unit and the generated gas outlet unit are disposed on a same plane of the reactor body, and a flow direction of the introduced gas is opposite to a flow direction of the generated gas.

12. The carbon monoxide treatment apparatus of claim 8, wherein the channel member is a pipe, and is connected with the partitioning plate and disposed in a direction perpendicular to a side of the partitioning plate facing the first section.

13. The carbon monoxide treatment apparatus of claim 8, wherein the reaction unit comprises a plurality of catalyst pellets.

14. The carbon monoxide treatment apparatus of claim 8, wherein the reaction unit comprises a monolith-type catalyst support and a catalyst layer coated to the catalyst support.

15. The carbon monoxide treatment apparatus of claim 9, further comprising an outlet unit for draining the condensate water.

16. The carbon monoxide treatment apparatus of claim 15, wherein the outlet unit comprises:
    an outlet unit line comprising an outlet unit channel for the condensate water, and connected with the condensate water storage unit; and
    a valve in the outlet unit line.

17. The carbon monoxide treatment apparatus of claim 16, wherein the outlet unit comprises a water level sensor in the condensate water storage unit for detecting a level of the condensate water.

18. The carbon monoxide treatment apparatus of claim 17, wherein the valve is a solenoid valve for selectively opening/closing the outlet unit channel according to a detection signal of the water level sensor.

* * * * *